Patented Aug. 20, 1935

2,011,806

UNITED STATES PATENT OFFICE 2,011,806

ANTHRACENE DERIVATIVE AND A PROCESS OF PREPARING IT

Wilhelm Eckert and Walter Gmelin, Frankfort-on-the-Main-Hochst, Germany, assignors to General Aniline Works, Inc., New York, N. Y., a corporation of Delaware No Drawing. Application June 30, 1931, Serial No. 548,028. In Germany August 22, 1930

8 Claims. (Cl. 260—131)

Our present invention relates to new anthracene derivatives and a process of preparing them.

We have found that new anthracene derivatives are obtainable in a smooth reaction and with a very good yield by treating with aluminium chloride, in the presence or absence of a solvent or diluent, at temperatures not exceeding 100° C., the products obtainable by condensing according to known methods (cf., for instance, German Patents 492,247, 493,688 and 499,051) antracene, or a substitution product thereof, with chloracetylchloride and having the following probable formula:

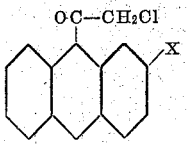

wherein X means hydrogen or a substituent of the group consisting of halogen and alkyl. The anthracene derivatives obtainable according to our new process are valuable intermediate products for the manufacture of dyestuffs. They are feebly yellow colored products, dissolve in concentrated sulfuric acid to an orange-yellow solution showing a greenish fluorescence and correspond with the probable general formula:

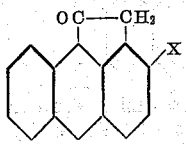

wherein X stands for hydrogen, alkyl or halogen. It is also possible that condensation products of the following general formula are obtained:

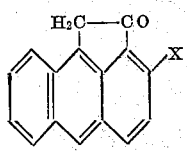

wherein X has the meaning as described above.

It is surprising that the starting materials when treated as above described react with formation of a ring since, for instance, an analogous product, i.e. the 1-chloracetylnaphthalene when treated in the same manner, is not condensed at all, or only with a very bad yield, to acenaphthenone.

The following examples serve to illustrate the invention but they are not intended to limit it thereto, the parts being by weight:

(1) 10 parts of the chloracetylanthracene obtainable by condensation of anthracene with chloracetylchloride and corresponding with the following probable formula:

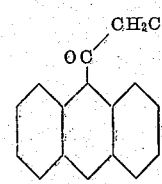

are thoroughly mixed with about 40 parts of aluminium chloride and 10 parts of sodium chloride and the whole is cautiously heated to about 60° C. A vivid reaction sets in and the temperature rises to about 100° C. Thereupon, the melt is introduced into ice, the whole is boiled for a short time, filtered with suction and the solid matter is washed and dried.

The reaction product thus obtained probably has the following constitution:

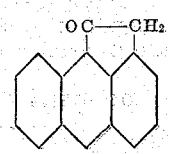

It crystallizes, for instance, from benzene in the form of yellow prisms melting at 151° C.–152° C. It dissolves in concentrated sulfuric acid to a yellowish orange solution showing a greenish fluorescence, whereas the starting material dissolves in concentrated sulfuric acid to a deep red solution.

(2) By starting from the product obtainable from 2-methylanthracene and chloracetylchloride and proceeding as in Example 1, there is obtained the corresponding ketone of 2-methylanthracene of the following probable constitution:

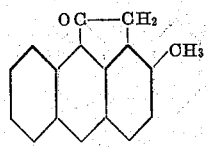

The crude product, for instance, may be dissolved and reprecipitated from alcohol. It crystallizes in yellow prisms melting at 127° C; it dissolves easily, for instance, in benzene. In concentrated sulfuric acid it dissolves to an orange yellow solution showing a yellowish green fluorescence.

(3) 20 parts of the product obtainable from β-chloranthracene and chloracetylchloride are dissolved in 120 parts of dry chlorobenzene and 50 parts of aluminium chloride are added thereto at 0° C.–10° C. The whole is stirred for about 24 hours until hydrochloric acid no longer evolves and a test portion taken from the mixture dissolves in sulfuric acid to an orange yellow solution showing a green fluorescence. The reaction temperature is advantageously not allowed to exceed 40° C. The product is isolated by addition of water to the melt, the chlorobenzene is distilled off by means of steam and the residue is recrystallized from alcohol. The product which has the probable constitution:

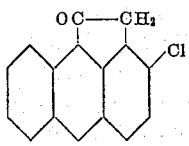

crystallizes in the form of yellow prisms melting at 165° C; it dissolves easily in benzene. In concentrated sulfuric acid it dissolves to an orange yellow solution having a yellowish green fluorescence.

As hereinbefore stated, there is a possibility that our new products, whose preparation and properties we have fully described, actually possess structural formulæ which are slightly different from those employed in the appended product claims. However, although we have been unable to conclusively determine that these structural formulæ are correct, they do to the best of our present knowledge and belief correctly represent the new products obtainable by the new process herein described and claimed.

We claim:
1. The process which comprises treating with aluminium chloride at a temperature not exceeding 100° C. a compound obtainable by condensing an anthracene compound with chloroacetylchloride and having the probable general formula:

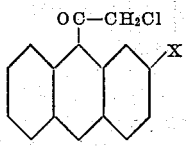

wherein X means hydrogen or a substituent of the group consisting of halogen and alkyl.

2. The process which comprises treating with aluminium chloride in the presence of sodium chloride at a temperature of about 60° C. to about 100° C. a compound obtainable by condensing anthracene with chloracetylchloride and having the probable formula:

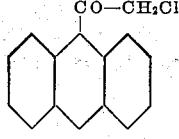

3. The process which comprises treating with aluminium chloride at a temperature of about 60° C. to about 100° C. a compound obtainable by condensing 2-methylanthracene with chloracetylchloride and having the probable formula:

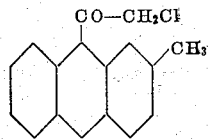

4. The process which comprises treating with aluminium chloride in the presence of chlorobenzene at a temperature of about 0° C. to about 10° C. a compound obtainable by condensing β-chloranthracene with chloracetylchloride and having the probable formula:

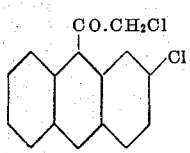

5. The compounds of the general formula:

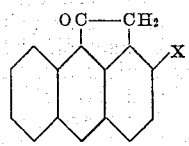

wherein X stands for hydrogen, alkyl or halogen said products having a feebly yellow color and dissolving in concentrated sulfuric acid to an orange-yellow solution showing a greenish fluorescence.

6. The compound of the formula:

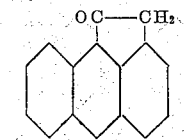

said product crystallizing from benzene in the form of yellow prisms melting at 151° C.–152° C. and dissolving in concentrated sulfuric acid to a yellowish orange solution showing a greenish fluorescence.

7. The compound of the formula:

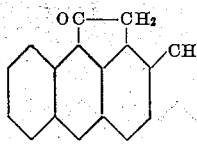

said product crystallizing from alcohol in yellow prisms melting at 127° C., easily soluble, for instance, in benzene and dissolving in concentrated sulfuric acid to an orange yellow solution having a yellowish green fluorescence.

8. The compound of the formula:

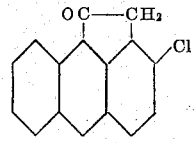

crystallizing in yellow prisms melting at 165° C., easily soluble in benzene and dissolving in concentrated sulfuric acid to an orange yellow solution showing a yellowish green fluorescence.

WILHELM ECKERT.
WALTER GMELIN.